US011340704B2

(12) United States Patent
Mansbridge et al.

(10) Patent No.: US 11,340,704 B2
(45) Date of Patent: May 24, 2022

(54) TACTILE AUDIO ENHANCEMENT

(71) Applicant: SUBPAC, INC., San Francisco, CA (US)

(72) Inventors: Stuart Mansbridge, Montreal (CA); Noah Baxter, San Francisco, CA (US); Louis-Piere Guidetti, Los Angeles, CA (US); Sarosh Khwaja, Palo Alto, CA (US); Todd Chernecki, Palo Alto, CA (US); Jérôme Lavoie, San Francisco, CA (US)

(73) Assignee: SUBPAC, INC., San Francisco, CA (US)

( * ) Notice: Subject to any disclaimer, the term of this patent is extended or adjusted under 35 U.S.C. 154(b) by 0 days.

(21) Appl. No.: 17/000,244

(22) Filed: Aug. 21, 2020

(65) Prior Publication Data

US 2021/0055796 A1 Feb. 25, 2021

Related U.S. Application Data

(60) Provisional application No. 62/889,834, filed on Aug. 21, 2019.

(51) Int. Cl.
| | |
|---|---|
| *G06F 3/01* | (2006.01) |
| *G06F 3/04812* | (2022.01) |
| *G06N 3/02* | (2006.01) |
| *G06F 3/16* | (2006.01) |

(52) U.S. Cl.
CPC .......... *G06F 3/016* (2013.01); *G06F 3/04812* (2013.01); *G06F 3/162* (2013.01); *G06F 3/167* (2013.01); *G06N 3/02* (2013.01)

(58) Field of Classification Search
CPC ................................. G06F 3/016; G06F 3/167
See application file for complete search history.

(56) References Cited

U.S. PATENT DOCUMENTS

| | | | |
|---|---|---|---|
| 7,307,619 B2 | 12/2007 | Cunningham et al. | |
| 2007/0038164 A1 | 2/2007 | Afshar | |
| 2014/0347177 A1* | 11/2014 | Phan ................... | H04N 21/4382 340/407.1 |
| 2015/0063606 A1 | 3/2015 | Alexiou et al. | |
| 2015/0170024 A1 | 6/2015 | Chatterjee et al. | |

(Continued)

OTHER PUBLICATIONS

PCT International Search Report and Written Opinion issued in corresponding application No. PCT/US2020/047523, dated Nov. 18, 2020.

(Continued)

*Primary Examiner* — Priyank J Shah

(74) *Attorney, Agent, or Firm* — Maschoff Brennan

(57) ABSTRACT

A system may include a tactile device configured to receive a tactile signal and generate vibrations corresponding to a tactile audio experience based on the tactile signal. The system may also include a computing device configured to perform operations that include receiving an audio signal, and decomposing the audio signal to identify one or more components of the audio signal. The operations may also include generating, by an artificial intelligence system of the computing device, a generated tactile signal based on the one or more components of the audio signal. The operations may also include providing the generated tactile signal to the tactile device.

17 Claims, 9 Drawing Sheets

(56) References Cited

U.S. PATENT DOCUMENTS

2016/0171987 A1 6/2016 Reams
2017/0325039 A1 11/2017 Khwaja et al.
2018/0315343 A1 11/2018 Shvartzberg et al.

OTHER PUBLICATIONS

Yaganoglu et al., Wearable Vibration Based Computer Interaction and Communication System for Deaf, Applied Science, Dec. 13, 2017, 18 pages.

\* cited by examiner

TACTILE AUDIO ENHANCEMENT

FIELD

The application relates generally to tactile audio enhancement.

BACKGROUND

For hundreds of years, people have enjoyed music, both playing music and listening to music. In recent years, the types of music available for listening have expanded exponentially, as has the equipment by which the user may listen to music. Often, the equipment by which a user may hear, or listen to, music may be located in the same room where the user is located and the playback of music may be controlled by the user.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure include a method of optimizing personalized tactile output. The method may include receiving an audio signal, decomposing the audio signal to identify one or more components of the audio signal, generating, by an artificial intelligence system, a tactile signal based on the one or more components of the audio signal. The method may also include, in response to the tactile signal, receiving feedback. The method may additionally include modifying parameters of the tactile signal in response to the received feedback.

BRIEF DESCRIPTION OF FIGURES

Example embodiments will be described and explained with additional specificity and detail through the use of the accompanying drawings in which.

DESCRIPTION OF EMBODIMENTS

Figure 1:
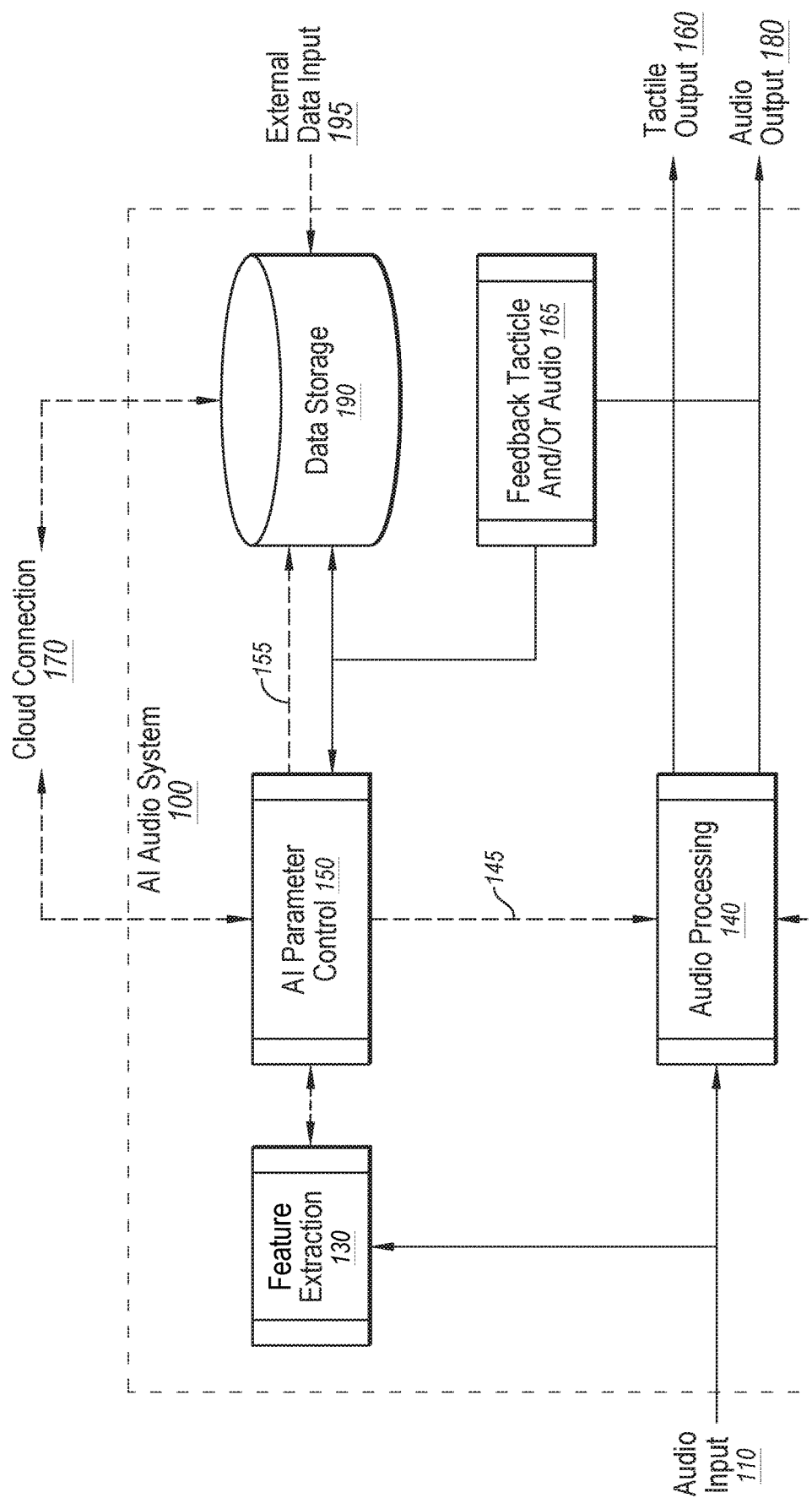
FIG. 1 illustrates an example environment within which tactile audio enhancement may be performed.

Listening to an audio piece, such as a music track, may be one aspect of an audio experience for a user. Feeling the audio piece may be another aspect of the audio experience for the user. For example, when attending a live concert, the tactile sensation felt as drums pound is significantly different than the sensation of simply hearing drum sounds through earbuds. In some instances, feeling the audio may simply include turning up the volume of the audio loud enough to be felt. In contrast, embodiments of the present disclosure may relate to the generation of vibrations (which may be referred to as tactile audio) associated with the audio piece. The generation of such tactile audio may allow the user to feel a physical dimension of the sound they hear, which may result in an immersive experience for both auditory perception and tactile perception of the user.

However, most audio signals are poorly suited to generating and/or providing tactile audio in conjunction with audible audio of the audio signal. For example, many audio tracks have poor recording quality and/or in production of the audio track, particularly with respect to low tones that correspond to tactile audio. This is in part because such tones were previously unused completely, and only recently have even been reproducible. Additionally, many audio signals do not include tones low enough to produce tactile audio, such as some forms of acoustic music. Furthermore, even many modern audio tracks that do include low tones do not automatically translate to a high-fidelity tactile sensation regardless of the auditory fidelity, or leverage the additional creative potential of being designed to optimize the tactile audio experience. Additionally, other factors may impact the quality and/or experience of tactile audio. For example, environmental factors, such as the setting in which the user is experiencing the tactile sound (e.g., sitting in a couch or chair, in a vehicle, walking around, sitting outside at a park, sitting in a closed office, etc.) can have a large impact on the tactile sound.

Because of the variety of factors that can influence tactile audio, and because the basis for such tactile is often not present in audio tracks, at least some embodiments of the present disclosure provide a system for generating and/or processing tactile audio signals. For example, the present disclosure may relate to software or other machine-based control of a processing to provide a consistent and high-quality tactile audio experience in different conditions. Furthermore, the present disclosure may include fast and/or dynamic adaptation to a real-time audio input signal. Such an input audio signal may be streamed or otherwise may or may not be known a priori by the audio processing system. Additionally or alternatively, such a system may be configured to analyze and/or adapt to audio signals and/or sensor data to adapt to content and/or environmental factors. Additionally or alternatively, the present disclosure may relate to the actual generation of a new tactile audio signal that may or may not be generated to be reproduced in conjunction with an audible component of an input audio signal.

In some embodiments, the tactile audio and/or audible audio may be processed and/or synthesized to recreate or enhance a particular music listening or other audio experience. For example, the sensations of both audible and tactile audio may be recreated for a live concert. Additionally or alternatively the tactile audio and/or audible audio may be processed and/or synthesized in a flat, raw, or neutral manner such that a sound engineer or audio producer may critically listen to and/or feel the audio such that they can produce it in a desired manner. Additionally or alternatively the tactile audio and/or audible audio may be processed and/or synthesized to deliver a completely new experience that is completely detached from a "real" experience that is being recreated. Depending on the context in which the tactile audio and/or audible audio are to be used (e.g., music, film, gaming, virtual reality (VR), etc.), the target metrics of the tactile audio and/or audible audio may be identified and/or adjusted.

In some embodiments, tactile enhancement may be used as part of an audio production or engineering process, in addition to or alternatively to being used during the playback/listening process. In such an embodiment, the tactile enhancement may be used to generate an optimized tactile signal to be added to an original audio piece. Such tactile enhancement may assist users (e.g., music producers/sound engineers, etc.) to create high quality tactile and/or auditory content. In some embodiments, the tactile signal may be generated automatically by the AI system by processing the original audio content. Parameter controls may be available for the user to modify the tactile signal. Alternatively or additionally, a user may input specific tactile signals as he or she sees fit in association with or in order to enhance the original audio piece. The tactile signals input by the user may or may not be associated with a specific track of the audio piece. In some embodiments, an AI system may provide feedback to the user by way of information regarding the quality of the tactile signals. For example, the AI system may analyze the tactile signals generated by the user and/or adjusted by the user with respect to one or more target metrics and provide feedback accordingly (e.g., the punch value is X, a typical punch target for this type of track is Y).

In some embodiments, the tactile signals may be generated by an artificial intelligence system. The artificial intelligence system may be trained by analyzing audio pieces in conjunction with tactile signals generated by a user for those audio pieces. The artificial intelligence system may learn to associate tactile signals with audio pieces and/or enhance audio pieces with tactile signals. The artificial intelligence system may learn to associate tactile signals with different tracks of audio pieces. The artificial intelligence systems may be refined by implementing user feedback in a continuous training process.

In some embodiments, the immersive audio experience described above may be enhanced by personalizing the tactile audio response felt in connection to the audio piece. For example, one user may prefer to feel a tactile audio response when drums are heard in the audio piece, while another user may dislike drums and prefer that a tactile audio response is felt as bass guitar notes and riffs are heard in the audio piece but not based on drums. In some embodiments, the tactile audio response may be user-specific according to user preferences with respect to the audio piece. Additionally or alternatively, the tactile audio response may be environment-specific such that the tactile audio response is personalized according to an environment of a user and/or an environment of a tactile audio device reproducing the tactile audio response.

In some embodiments, the tactile audio response may be personalized by an artificial intelligence system. The artificial intelligence system may be trained by analyzing historic user preferences and listening history. The artificial intelligence system may also be trained by analyzing user preferences and listening history in conjunction with environmental or situational data. For example, if a user often chooses to listen to upbeat music with an accompanying tactile audio response of high intensity at a certain time of day, the artificial intelligence system may learn to provide a tactile audio response of such intensity to accompany upbeat music at that time of day. The artificial intelligence system may also analyze the posture of the user and provide a tactile audio response to match or alleviate a mood of the user.

In these and other embodiments, when generating the tactile audio response and/or selecting the target metrics and their associated target values to which the tactile audio response is optimized, the AI system may consider a variety of data inputs available. Such information may include the use-case and media type (e.g., VR, film, music, video game, etc.), a sub-classification of the audio (e.g., genre (classical, rap, R&B, etc.), instrumentation (piano, guitar, cello, etc.), etc.), preset targets of the target metrics associated with a particular musician/producer and/or designed for a general preference (e.g., "drum maniac"), and/or large scale statistical aggregation of user preference data to produce target metrics based on general user preferences.

These and other embodiments are described with reference to the appended figures. In the appended figures, features and components with like item numbers indicate similar structure and function unless described otherwise. The appended figures are not necessarily to scale.

FIG. 1 illustrates an example environment within which tactile audio enhancement may be performed, in accordance with one or more embodiments of the present disclosure. An AI (artificial intelligence) audio system 100 may receive an audio input 110, manual control 120, and external data input 195. In communication with a cloud connection 170 (and/or in the local system 100), the AI audio system 100 may output audio output 180 and tactile output 160. The AI audio system 100 may accumulate data within local storage at data storage 190, or the AI audio system 100 may accumulate data elsewhere, such as a remote system accessible via the cloud connection 170. The AI audio system may utilize reinforcement learning or other AI approach within the AI audio system or models may be regularly trained elsewhere and transmitted to the AI audio system by the cloud connection 170.

The audio input 110 may be received by the AI audio system 100. The audio input 110 may undergo feature extraction 130. Feature extraction 130 may include analyzing the audio input 110 to determine characteristics of the audio input 110 such as frequency, amplitude, tonal balance, pitch, coloration, rhythm, and the like. The audio characteristics may be identified via waveform analysis, frequency spectral comparison, or any other audio analysis technique. In some embodiments, the audio characteristics may be determined via a blind source separation, or may introduce a harmonic percussive source separation in which harmonic tones are separated from percussive tones.

Feature extraction 130 may further include analyzing the characteristics of the audio input 110 to determine genre, artist, and style of the audio input 110. Feature extraction may include analyzing metadata of the audio input 110 to determine characteristics of the audio input 110. Feature extraction 130 may include analyzing the audio input 110 to identify different tracks of the audio input 110. Feature extraction may include analyzing characteristics of the audio input 110 to identify a known song. Feature extraction may identify the audio input 110 as a known song with known characteristics or independently identify characteristics of the audio input 110.

Characteristics of the audio input 110 identified or extracted in feature extraction 130 may be sent to AI parameter control 150. The AI parameter control 150 may control several different parameters relating to characteristics of the audio input 110 extracted or identified by the feature extraction 130. Additionally or alternatively, the AI parameter control 150 may affect which features are extracted by the feature extraction 130 and how they are extracted. The AI parameter control may send algorithm data 155 to data storage 190.

In some embodiments, the algorithm data 155 may include any data used by the AI parameter control 150. For example, the algorithm data 155 may include information on how parameters are modified based on features extracted in the feature extraction 130. As another example, the algorithm data 155 may include information on how algorithms employed in the AI parameter control 150 have changed. As an additional example, the algorithm data 155 may include information on how audio characteristics are extracted in the feature extraction 130.

The data storage 190 may receive and store the algorithm data 155 from the AI parameter control 150. The data storage 190 may be located in a piece of hardware which performs optimization/improvement/enhancement of personalized tactile feedback or it may be communicatively linked to the hardware via a wireless connection. The data storage may communicate with a server or database (not pictured) through the cloud connection 170. The cloud connection 170 may receive and transmit data from the data storage 190 to a server or database (not pictured) or another location. The cloud connection 170 may communicate with the AI parameter control 150. The cloud connection 170 may transmit data to the AI parameter control 150 and the AI parameter control 150 may transmit data to the cloud connection 170. The AI parameter control 150 may transmit data on algorithms and parameters to the cloud connection 170 and the cloud connection may transmit data on algorithms and instructions to the AI parameter control 150 in response to the data transmitted by the AI parameter control 150 and the data storage 190.

The AI parameter control 150 may continue to communicate with the cloud connection 170 to refine the algorithms used by the AI parameter control 150. The AI parameter control 150 may continue to transmit data to the cloud connection 170 and continue to transmit algorithm data 155 to the data storage 190. The data storage 190 may continue to transmit data to the cloud connection 170. In response to the data received from the AI parameter control 150 and the data storage 190, the cloud connection may transmit instructions to the AI parameter control 150 in an iterative process as new data is received. Such a cycle may allow the AI audio system 100 to "learn" by continuously refining its algorithms. The AI audio system 100 may learn to generate tactile feedback associated with the audio input 110. The AI audio system 100 may learn to personalize tactile feedback to the user.

In some embodiments, feedback 165 regarding the tactile output 160 and/or the audio output 180 may be sent back to the feature extraction process 130, AI parameter control 150 and/or the cloud connection for analysis. For example, the feedback 165 may include comparing a resulting signal of the audio processing 140 to an expected or target signal based on the AI parameter controls 150. If the resultant signal is within a target threshold of given target metrics, the feedback 165 may indicate positively that the audio processing 140 as informed by the AI parameter control 150 was effective. Alternatively, if the resultant signal is outside of the target threshold of the given target metrics, the feedback 165 may indicate that the audio processing 140 was not effective such that the AI parameter control 150 may adjust and/or modify the audio processing 140 to attempt to better meet the target threshold. As another example, if the resultant signal is outside of the target threshold of the given target metrics, the feedback 165 may indicate the feature extraction process 130 may be performed more effectively. By providing such feedback, the feature extraction process 130 and/or the AI parameter control 150 may continue to learn and improve the effectiveness of the audio processing 140.

In some embodiments, the AI parameter control 150 may control the intensity of tactile feedback associated with a track of the audio input 110, and/or any other target metrics (following intensity as an example). The AI parameter control 150 may transmit the algorithm data 155 which determines the intensity of the tactile feedback to the data storage 190. The AI parameter control 150 may also transmit data concerning the intensity of the tactile feedback to the cloud connection 170. The cloud connection 170, in response to the data concerning the intensity of the tactile feedback received from the AI parameter control 150 may transmit data to the AI parameter control 150 with instructions to maintain or alter the intensity of the tactile feedback. The cloud connection 170 may also transmit instructions to maintain or alter the intensity of the tactile feedback in response to data received from the AI parameter control 150, the data storage 190, the feedback 165, and/or any combinations thereof. The AI parameter control 150 may then implement the instructions from the cloud connection 170 and then transmit data to the cloud connection 170, or the data storage 190, or both, beginning the process over again. The AI parameter control 150 may improve its algorithms through several iterations.

The data storage 190 may receive data from the external data input 195. The external data input 195 may include input from sensors and/or a user. The external data input 195 may include sensor data such as temperature, light intensity, light frequency, humidity, noise levels, acceleration, time, position, pressure, force, etc. Additionally or alternatively, the external data input 195 may include subjective data from the user. The subjective data may include feeling descriptors meant to convey an emotional reaction (e.g., whether or not the user enjoyed the experience, whether or not the tactile audio "felt good," whether certain instruments or components felt "too loud," ratings for one or more potential target metrics (e.g., balance, punch, clarity, etc.), etc.). The subjective data may include video of the user and the user's facial expression. The subjective data may include voice capture and analysis. The subjective data may include text analysis and/or natural language processing. The external data input 195 may include sensor data from a tactile feedback hardware such as acceleration, pressure, and intensity of tactile feedback. The external data input 195 may include user interface usage data such as clicks and navigation pathways to monitor how the user navigates a system designed to implement a method for optimizing tactile feedback. The external data input 195 may include biometric data of the user such as heart rate, pupil dilation, perspiration, etc.

In some embodiments, the external data input 195 received by the data storage 190 may be transmitted to the cloud connection 170. The cloud connection 170 may transmit instructions to the AI parameter control 150 based on the external data input 195 and other data from the data storage 190. This may allow the AI parameter control 150 to alter parameters and/or algorithms in an iterative process.

In an example embodiment, the AI parameter control 150 may, based on characteristics of the audio input 110 from the feature extraction 130, determine an intensity level and/or other value/level for tactile feedback and/or any other target metrics. Following intensity as an example, the AI parameter control 150 may transmit the algorithm data 155 showing the intensity level and the algorithm used to determine the intensity level to the data storage 190. After the intensity level is implemented, the data storage 190 may receive external data input 195 such as a heart rate of the user and transmit the heart rate along with the algorithm data 155 to the cloud connection 170. The cloud connection 170 may transmit instructions from a server or database (not pictured) which may cause the AI parameter control 150 to alter the intensity level and/or the algorithm used to determine the intensity level. Such a process may occur in an iterative manner such that the AI parameter control 150 reacts to the external data input 195 in the form of a heart rate according to instructions transmitted by the cloud connection 170. The AI parameter control 150 may alter its algorithms over successive iterations to adapt to a particular user and provide personalized tactile feedback.

The AI parameter control 150 may provide automatic control 145 to audio processing 140. The audio processing 140 may determine the type of processors used, sequencing, automation, and parameter values. The automatic control 145 is provided by the AI parameter control 150 based on data received by the AI parameter control 150 from the feature extraction 130 and the cloud connection 170. The audio processing 140 may also receive manual control 120. Manual control 120 may include input from the user for one or more parameters. Manual control 120 may take precedence over automatic control 145 or vice versa. Alternatively or additionally, either automatic control 145 or manual control 120 may take precedence depending on their temporal relationship at the audio processing 140.

The audio processing 140 may receive the automatic control 145 and the manual control 120 and the audio input 110. The audio processing 140 may alter the audio input 110 based on the automatic control 145 and/or the manual control 120. The audio processing 140 may continue to alter the audio input 110. The audio processing 140 may transmit the tactile output 160 to the data storage 190. The combination of the audio input 110 and the tactile output 160 may allow the AI audio system 100 and/or the cloud connection 170 to determine how the audio processing 140 is generating the tactile output 160 based on the audio input 110.

In some embodiments, the audio processing 140 may operate on the audio input 110 to modify and/or generate both the tactile output 160 and the audio output 180. For example, the audio processing 140 may be configured to synthesize the tactile output 160 from the audio input 110 when the audio input 110 does not include a tactile component. In some embodiments, the audio processing 140 may alter one or both of the tactile output 160 and the audio output 180 to provide a coordinated and cohesive audio experience. For example, in some embodiments, the audio processing 140 may operate in a certain manner to generate only the audio output 180. After turning on a tactile device for providing tactile audio or otherwise indicating that tactile audio is desired, the audio processing 140 may modify the processing performed on the audio output 180 such that the audible portion of the input audio 110 is better suited to being experienced in conjunction with tactile audio.

In some embodiments, the audio processing 140 may include a variety of tuning or other processing techniques applied to the audio input 110, and/or a processed version of the audio input 110, such as separated components of tactile audio and audible audio. Examples of such processing may include spatialization, which may include altering the spatial dimension and/or the perceived spatial dimension of the audio. For example, stereo and/or binaural (3D) techniques, mid/side processing, interaural time difference (ITD) and/or interaural level differences (ILD), etc. may be used to adjust the spatial concept of the audio. As another example of such processing, acoustic modelling may be utilized, which may match the acoustics of another environment, such as a concert hall, a cathedral, etc. The acoustic modeling may be accomplished using reverberation and deverberation, and/or a resonator to control the amount of reverberation and/or resonance. As an additional example of such processing, frequency crossover may be used, which may control and/or modify which frequencies and/or how much of a given frequency is handled as audible audio vs tactile audio. Such frequency crossover may be accomplished using high/low pass filters for complete filtering, and may use shelving filters for weighting and/or providing certain frequencies as both audible and tactile audio. As a further example of such processing, dynamic adjustments may be included, which may modify which dynamic content and/or how much of a given dynamic content is handled as audible audio vs tactile audio. Such dynamic adjustment may be accomplished using compression, multi-brand compression, transient shaping, and/or any combinations thereof. An additional example of such processing may also include levels of certain signals. For example, the relative levels of the tactile and audible audio may be adjusted to be complementary.

The data received and transmitted by the data storage 190 may be used by the AI audio system 100 and/or the cloud connection 170 to train elements of the AI audio system 100. In some embodiments, the AI parameter control 150 may modify its algorithms and/or models in response to instructions from the cloud connection 170 meant to improve performance of the AI audio system 100. In other embodiments, the AI parameter control 150 may modify its algorithms in response to data from the data storage 190. For example, the AI parameter control 150 may receive the external data input 195, the feedback 165, the tactile output 160, and/or the algorithm data 155 from the data storage 190 and modify its algorithms according to the data received from the data storage 190. In some embodiments, the AI parameter control 150 may send the automatic control 145 to the audio processing 140 which may generate the tactile output 160 and send it to the data storage 190. The data storage 190 may transmit the tactile output 160 and the external data input 195 to the AI parameter control 150. The AI parameter control 150 may determine, based on the external data input 195, that the algorithms used to generate the tactile output 160 should be modified. The algorithms may be continuously refined over time, allowing the AI audio system 100 to "learn." This "learning" process may be utilized by the AI audio system 100 to learn to generate the tactile output 160 based on audio input 110 and/or to learn to personalize the tactile output 160 to preferences of the user. The AI audio system 100 may introduce randomness into the algorithms to optimize the tactile output 160 to the preferences of the user. Additionally or alternatively, similar or comparable modifications may or may not be made regarding the audio output 180 such that the audio output 180 may be processed to operate in conjunction with the tactile output 160.

For some parameters and/or functions, the AI audio system 100 may learn the preferences of the user and modify its algorithms accordingly. Alternatively or additionally, the AI audio system 100 and/or the cloud connection 170 may aggregate data from many users to create modified algorithms that are the same for each AI audio system 100 or which serve as templates for algorithms for each AI audio system 100. The user may have the option of loading standard algorithms or algorithm templates onto the AI audio system 100. The user may have the option of selecting which parameters and/or functions remain static and which may be modified by the AI audio system 100.

In some embodiments, a variety of factors that may interrelate may be used as the target metrics when processing the input audio 110 and/or in determine the effectiveness of the AI audio system 100. Such targets may be selected and identified based on the context and/or purpose of the tactile audio and/or audible audio. For example, tactile audio for a video game may have different target metrics than the tactile audio for a classical music piece whose performance was recorded in the year 1965. As another example, the target metrics for the audible audio and the tactile audio for a rap song may be different from the target metrics for the audible audio and the tactile audio for a movie soundtrack. In some embodiments, different sources and/or component of the input audio 110 may have distinct target metrics. For example, tactile audio signals corresponding to drums may be processed and/or optimized based on one set of target metrics and the tactile audio signals for the same audio track corresponding to bass guitar may be processed and/or optimized based on a different set of target metrics. In some embodiments, when optimizing and/or adjusting towards the target metrics, there may be priority and/or weighting for various target metrics. For example, one target metric may be optimized for first, and then adjustments may be made that keep that target metric within a threshold range while then improving other target metrics. As another example, multivariate optimization may be used across multiple target metrics as they are optimized concurrently.

In some embodiments, the target metrics may include various parameters or concepts that may be representative of the tactile audio and/or the audible audio. For example one such target metric may include intensity, which may represent the level/volume of the tactile signal relative to the audible audio. Another example includes balance, which may represent the distribution of energy across the tactile frequency range. Another such example includes clarity, which may represent definition and separation of frequency content, where low clarity may represent overlapping and/or undefined frequencies while high clarity provides distinct frequencies. An additional such example includes punch, which may represent the shape of transient events and/or their physical impact in tactile sensation. Another such example includes density, which may represent the quantity of low frequency content in the time domain, or in other words, amount of activity vs. inactivity of the tactile audio. Another such example includes synchronicity, which may represent the time difference between tactile audio and audible audio (e.g., it may be desirable to have the tactile audio shortly before (e.g., 0-20 ms) the audible audio). An additional such example includes rumble, which may represent inharmonic sub-frequencies that may create a texture in tactile sensation. An additional such example includes content, which may represent the type of audio components that may be desirable or undesirable in the tactile audio (e.g., speech may be removed from tactile audio while missing audio content such as music without low frequencies due to the age of the recording may be added back in). Another such example includes spatiality, which may represent the localization of audio via multi-channel reproduction of tactile audio (e.g., providing different frequency ranges, instruments, etc. to different parts of the body to reduce masking and/or to provide a more immersive experience). For example, tactile audio of the drum portion of an audio track may be provided to the back of a user while the tactile audio of the bass guitar portion of the audio track may be provided to the thighs and calves of the user.

In these and other embodiments, each of these potential target metrics may be monitored and the AI audio system 100 may begin to be trained by collecting and analyzing various datasets (e.g., audio tracks) to provide indications of what the rank or value is for one or more of the potential target parameters. Additionally, the potential modifiable parameters of the audio processing 140 may be monitored to observe the effect of the various possibilities of audio processing 140 on the potential target parameters. In these and other embodiments, target values may be obtained for one or more of the target metrics based on the context and/or use of the audio signal, and the AI audio system 100 may be trained on the known datasets to facilitate identification of a rank or value of the potential target metrics and which audio processing techniques modify those ranks/values in which ways. In some embodiments, a trained version of the AI audio system 100 may be tested to verify that the transformations/audio processing 140 reaches the target result (e.g., the feedback 165 may be used to verify that the audio processing 140 caused the tactile output 160 and/or the audio output 180 reached the target values for the one or more target metrics). In these and other embodiments, large scale datasets may be obtained by observing user preferences, manners in which different AI audio systems 100 processed the same audio track, etc. such that additional updates to the trained AI audio system 100 may be provided (e.g., such data may be provided via the cloud connection 170, and updates to the trained AI audio system 100 may be provided via the cloud connection 170 to modify and/or update the audio processing 140).

In some embodiments, the training of identification and/or a range/value being provided for the target parameters, and or their optimization may be accomplished via any of a variety of machine learning techniques or other approaches. For example, one or more classifiers may be used (e.g., given input variables, the classifiers may predict a discrete output classification for a target parameter). Continuing the example of classifiers, a classifier may quantify a track or component thereof as having low/medium/high punch, identifying the track or component thereof as speech/music, and/or classifying a track or component thereof based on genre, media type, etc. Another example of such techniques may include a regression analysis. For example, using regression, a set of input variables may be received and a continuous quantity may be output for a given target parameter (e.g., a punch value may be returned from a continuous scale, or the audio processing 140 parameters to achieve a certain target may be output). Such values may be used in conjunction with neural networks, linear regression, lasso regression, etc. Another example of such techniques may include customized optimization algorithms. For example, using such algorithms, certain cost functions may be used to achieve target values for the target parameters via feedback optimization using the feedback 165 and/or gradient descent. For example, if the target parameter is balance and there are target values for the frequency balance, the audio processing 140 may be modified and/or adjusted until the target value for the target metric is achieved. Another example of such techniques may include a neural network, such as a standard neural network or a convolutional neural network. For example, the AI audio system 100 may be trained based on feature values of selected features and/or sensor inputs, and/or a spectrogram without feature selection, and may return values for the target metrics and/or return audio processing 140 parameters to achieve a desired transformation. Another example of such techniques may include reinforcement learning. For example, the AI audio system 100 may monitor the feedback 165 that comes from a user to modify a self-training goal. For example, this may facilitate identifying a rating/value for a target metric (e.g., the user provides input of a clarity level) and/or for the audio processing 140 parameters (e.g., the user indicates that the audio processing 140 worked well). In some embodiments, such an approach may provide feedback at an individual level (e.g., for a particular algorithm such as identifying a level of clarity) or at a global level (e.g., for performance of the entire AI audio system 100).

Figure 2:
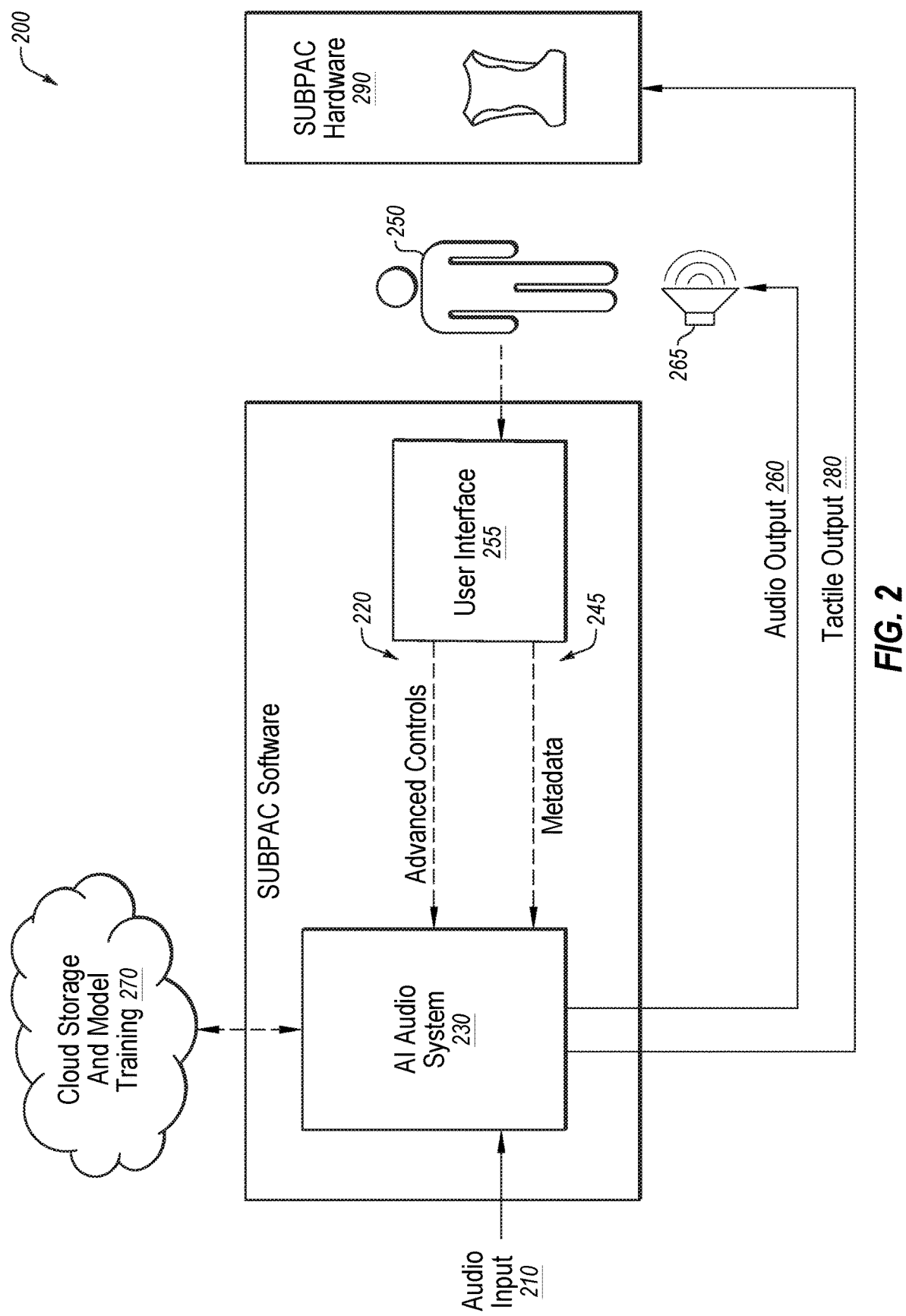
FIG. 2 illustrates another example environment within which tactile audio enhancement may be performed.

FIG. 2 illustrates another example environment within which tactile audio enhancement may be performed, in accordance with one or more embodiments of the present disclosure. For example, a music creation system 200 may represent an example of an embodiment in which the AI audio system 100 of FIG. 1 is used in music creation/engineering. The music creation system 200 utilizing an AI audio system 230 may be used in music composition, sound design, mixing, and mastering. The AI audio system 230 may be the same or similar to the AI audio system 100 of FIG. 1. Similarly to FIG. 1, audio input 210 may be received by the AI audio system 230 which may generate audio output 260 and tactile output 280. A user 250 (e.g., a sound engineer, music producer, etc.) may receive the audio output 260 through an audio device 265 and the tactile output 280 through a tactile device 290. The user 250 may interact with a user interface 255. The user interface 255 may transmit metadata 245 and advanced controls 220 to the AI audio system. The advanced controls 220 and metadata 245 may fulfill the role of the external input 195 of FIG. 1. The advanced controls 220 may be part of SUBPAC® software. Feedback from the user 250 in the form of the advanced controls 220 and the metadata 245 may be used by the AI audio system 230 to learn to improve the audio output 260 and the tactile output 280. Information may be shared with a cloud storage and model training 270. The AI audio system 230 may contribute and/or receive improved algorithms from the cloud storage and model training 270.

The cloud storage and model training 270 may include a database containing information from several music creation systems 200. The cloud storage and model training 270 may sort information from the music creation system 200 to refine algorithms and train new models for implementation in the music creation system 200.

The audio device 265 may include any device capable of delivering the audio output 260 to the user 250 including, but not limited to, headphones and speakers. The tactile device 290 may include any device capable of delivering the tactile output 280 to the user 250 including, but not limited to, SUBPAC® hardware such as the M2X. The advanced controls 220 may include controls present in a Digital Audio Workstation. The advanced controls 220 may control digital signal processing parameters. The metadata 245 may include music genre, intended playback medium, artist, audio engineer, title, duration, album name, copyright information, writer, publisher, and subjective descriptors and ratings.

The AI audio system 230 may compare the metadata 245 and the advanced controls 220 to the audio input 210 to learn to engineer tactile output 280 for music. For example, the AI audio system 230 may learn to replicate the advanced controls 220 input by the user 250 for the audio input 210 and the accompanying metadata 245. Additionally or alternatively, the AI audio system 230 may learn to determine certain aspects of the metadata 245 including artist and genre based on the audio input 210.

In some embodiments, the AI audio system 230 may serve as an aid to the user 250 by providing tactile output 280 which helps to identify features of the audio input 210. The AI audio system may learn over time which features the user 250 wants identified with tactile output 280 and in what manner the tactile output 280 should be delivered through the tactile device 290. In this way, the AI audio system 230 may learn to be more helpful to the user 250 in creating/engineering music by more effectively identifying features of the audio input 210 with tactile output 280. The AI audio system 230 may communicate with the cloud storage and model training 270 to share trained algorithms or "models" with the cloud storage training 270. Thus, The AI audio system 230 may include effective algorithms for aiding in music creation/engineering before extensive training. The AI audio system 230 may continuously communicate with the cloud storage and model training 270 to continuously improve algorithms for aiding in music creation/engineering.

For example, the AI audio system 230 may learn to recognize how an audio engineer processes certain tracks. The AI audio system 230 may learn to recognize which processes the audio engineer applies to drum tracks. The AI audio system 230 may learn to replicate the digital signal processing applied by the audio engineer and aid in processing music by prompting the audio engineer with proposed digital signal processing. Additionally or alternatively, the AI audio system 230 may learn to recognize in what order the audio engineer processes tracks and prompt the audio engineer with a list of tracks to process first. For example, if the audio engineer usually processes the drum track first, the AI audio system 230 may prompt the audio engineer with tactile feedback associated with the drum track and proposed processing at the beginning of an audio engineering session.

In some embodiments, the AI audio system 230 may learn to prepare the tactile output 280 which enhances the listening experience of the audio output 260. The AI audio system may observe actions of the user 250 in inputting the advanced controls 220 and generating the tactile output 280. The AI audio system 230 may compare the audio input 210, the advanced controls 220, and the tactile output 280 to learn to generate and/or proposed future tactile outputs 280 for future tracks based on the audio input 210 and/or the metadata 245 based on the actions of the user 250. The AI audio system 230 may communicate with the cloud storage and model training 270 to share trained algorithms or "models" with the cloud storage training 270. Thus, the AI audio system 230 may include effective algorithms for generating tactile output 280 before extensive training. The AI audio system 230 may continuously communicate with the cloud storage and model training 270 to continuously improve algorithms for generating tactile output 280. The cloud storage and model training 270 may update the algorithms to reflect further optimization as informed by multiple systems.

For example, the AI audio system 230 may learn how audio engineer A processes audio and how he prepares tactile output 280 and transmit data to the cloud storage and model training 270. Audio engineer B may receive algorithms and/or model training to his AI audio system 230 through its cloud storage and model training 270. Audio engineer A may also receive algorithms and/or model training developed by the AI audio system 230 used by audio engineer B.

In some embodiments, the AI audio system 230 may compare the audio input 210 to the audio output 260 when the user 250 is mastering or mixing audio to learn how to engineer tactile output 280 for music. The AI audio system 230 may analyze the digital signal processing parameters chosen by the user 250 to learn how to engineer tactile output 280 for music. The AI audio system 230 may analyze the way the user 250 interacts with the user interface 255 (clicks, navigation) to learn how to optimize the user interface 255 and/or to learn which parameters are important to the user 250. The AI audio system 230 may analyze sensor data from the tactile device 290 to learn how the tactile output 280 translates into physical movement felt by the user 250.

In some embodiments, the AI audio system 230 may learn what style of flat or neutral recreation of the tactile audio the audio engineer prefers to facilitate their sound production. Such values may be based on a certain set of target values for one or more target metrics. Such values may be provided to a cloud system such that the identified values may be compared and/or used for other audio engineers to provide a sample "flat" or "neutral' recreation of the tactile audio.

In some embodiments, the "ideal" of the target metrics may be personalized and/or customized. For example, a particular user, sound engineer, etc. may customize or adjust their preferred settings as they experience the tactile audio. In some embodiments, such customization may be saved and stored locally and/or in a cloud-based system. In these and other embodiments, if a user were to access a separate tactile audio-producing device, the customization of that user may be loaded into the separate tactile audio-producing device. For example, the user may have one customization set for their vehicle, and that some customization may be loaded into a theater seat in a theater the user visits. In some embodiments, when loading the customization, the variation based on the different environments in which the user is using the tactile audio-producing device may be reflected in the customization. For example, the target metrics may be adjusted by a known difference between the tactile audio-producing device as used in the vehicle as opposed to the theater seat.

In some embodiments, certain predictions may be made based on similar preferences for target metrics for one user compared to a large number of other users. For example, if a target user had similar preferences to a set of users who customized certain tracks, environments, target metrics, etc. a certain way, similar customizations may be suggested or proposed for the target user.

Figure 3:
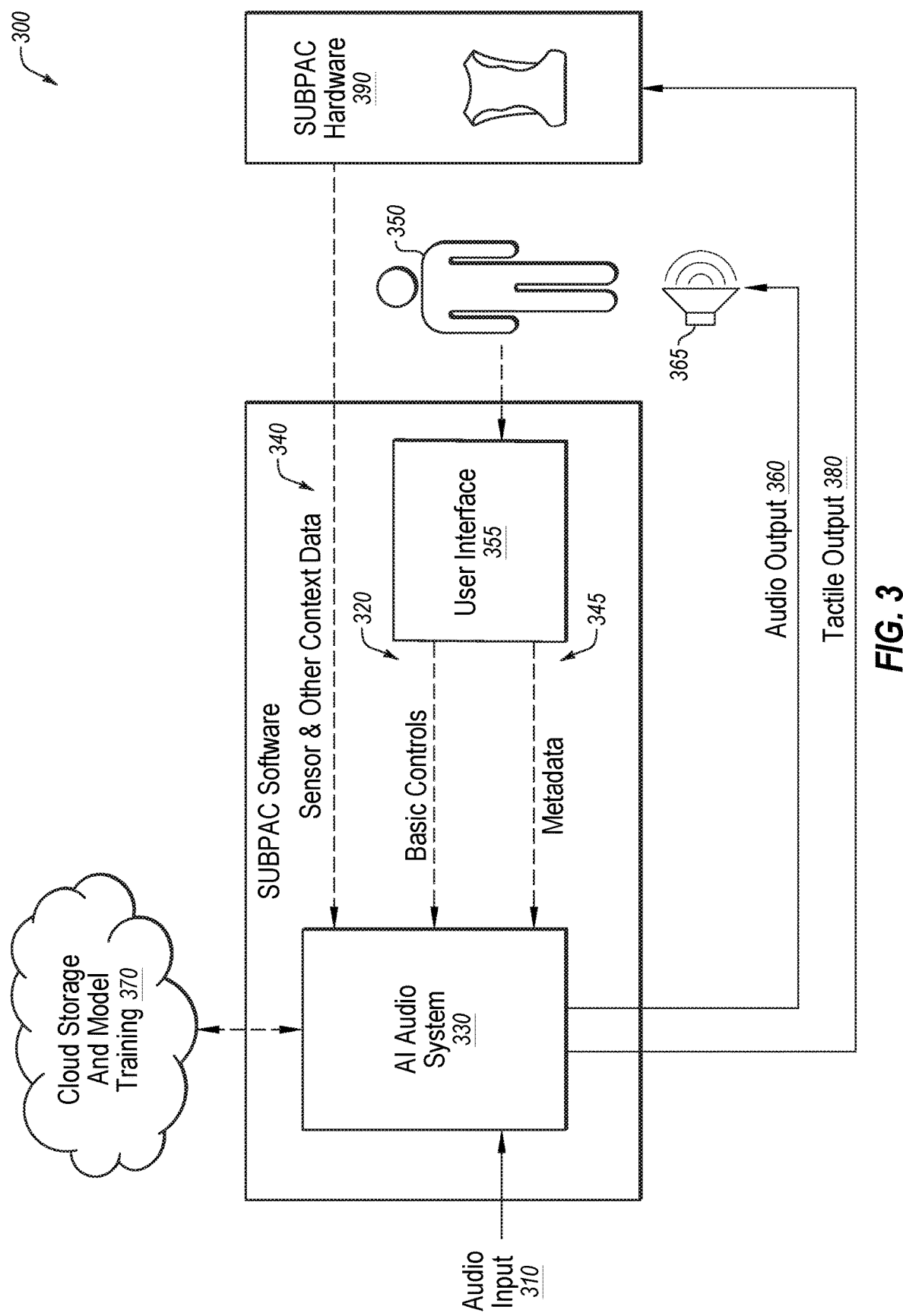
FIG. 3 illustrates another example environment within which tactile audio enhancement may be performed.

FIG. 3 illustrates another example environment within which tactile audio enhancement may be performed, in accordance with one or more embodiments. For example, a vehicle audio system 300 may represent an embodiment where the AI audio system 100 of FIG. 1 is used to enhance the listening experience of a user 350 in a vehicle audio system 300. The basic structure of the vehicle audio system 300 may be adapted to cover other embodiments. For example, the disclosed method of optimizing tactile feedback may be implemented in a consumer product or a seat to optimize tactile feedback for music listening, gaming, film, and/or augmented or virtual reality. Thus, the provision of the vehicle audio system 300 merely serves as an example of a particular environmental context in which the tactile audio is to be experienced. An AI audio system 330 may be the same or similar to the AI audio system 100 of FIG. 1. The basic structure of the vehicle audio system 300 is similar to that of the music creation system 200 of FIG. 2. The audio system 330 receives audio input 310 and outputs audio output 360 through an audio device 365 and outputs tactile output 380 through a tactile device 390 to a user 350. The user interacts with a user interface 355 to input basic controls 320 and/or metadata 345 which are transmitted to the AI audio system 330. The basic controls 320 may be part of SUBPAC® software. The tactile device 390 transmits sensor and/or other context data 340 to the AI audio system. The AI audio system 330 communicates with a cloud storage and model training 370 to share algorithms and parameters. The vehicle audio system 300 may use the AI audio system 330 to learn how to optimize and/or personalize the audio experience of the user 350.

The cloud storage and model training 370 may include a database containing information from several vehicle audio systems 300. The cloud storage and model training 370 may sort information from the vehicle audio system 300 to refine algorithms and train new models for implementation in the vehicle audio system 300.

For example, the cloud storage and model training 370 may receive data from many vehicle audio systems 300 and analyze the data to extract general trends. For example, the cloud storage and model training 370 may receive data from many vehicle audio systems 300 about the intensity users choose for the tactile output 380. The cloud storage and model training 370 may analyze that data and create generalized models for intensity levels based on user profiles.

The audio device 365 may include any device capable of delivering the audio output 360 to the user 350 including, but not limited to, headphones and speakers. The tactile device 390 may include any device capable of delivering the tactile output 380 to the user 350 including, but not limited to, SUBPAC® hardware such as the M2X. The tactile device 390 may include a seat in a vehicle with built-in tactile transducers and sensors. The sensors may include vibration sensors, temperature sensors, pressure sensors, microphones, and accelerometers. The tactile device 390 may also receive information from the vehicle including engine information, speed, and location. The sensors may be used to detect the position/weight of the driver as well as contextual circumstances including ambient noise and vibration.

The metadata 345 may be input by the user 350 using the user interface 355 or it may be included in the audio input 310. The basic controls 320 may include the same elements as the advanced controls 220 of FIG. 2 or fewer elements. The basic controls 320 may include a parameter that allows the user 350 to control the volume of the tactile output 380 of the tactile device 390. The basic controls 320 may include a parameter that allows the user 350 to approve or disapprove of the tactile output 380. The basic controls 320 may include a survey which may pose questions to the user 350 as to subjective aspects of the tactile output 380.

For example, the AI audio system 330 may recognize that the user 350 approves of rock music with intense tactile output 380 associated with drums and has indicated in surveys that drums are his favorite part of many songs. In response to this information, the AI audio system 330 may increase the intensity of tactile output 380 associated with drums and decrease the intensity of the tactile output 380 associated with other tracks.

As an additional example, the AI audio system 330 may recognize that the user 350 chooses tactile output 380 associated with drums for certain genres or artists. The AI audio system 330 may learn to provide tactile output 380 associated with drums for those genres or artists. The AI audio system may transmit algorithm data to the cloud storage and model training 370 related to the drums tactile output 380 in association with certain genres or artists. The cloud storage and model training 370 may analyze the algorithm data and create models to share with other AI audio systems 330 which associate drums tactile output 380 with certain genres or artists.

The vehicle audio system 300 may use the AI audio system 330 to learn to optimize and/or personalize the tactile output 380. In some embodiments, the AI audio system 330 may receive the sensor and other context data 340, the basic controls 320, the metadata 345, and the audio input 310 and compare them to each other to understand how the user 350 responds to the audio output 360 and the tactile output 380 in certain circumstances. For example, if a user 350 increases the volume of the tactile output 380 when the sensor and other context data 340 indicate a high level of vibration from the vehicle, the AI audio system 330 may modify its algorithms to increase tactile output 380 volume when sensor and other context data 340 indicate a high level of vibration from the vehicle. Similarly, the AI audio system may learn to personalize the tactile output 380 to preferences of the user 350 based on interactions of the user 350 with the user interface 355 and a selection of the basic controls 320.

The AI audio system 330 may optimize the tactile output 380 and share trained algorithms with the cloud storage and model training 370 for use in vehicles in general, for the specific tactile device 390, and/or for the user 350 specifically. The vehicle audio system 300 may be optimized based on information gathered by the vehicle audio system 300 or based on information gathered by multiple systems. The AI audio system 330 may have pre-trained algorithms or it may begin optimization for the user with default parameters. The AI audio system 330 may continuously communicate with the cloud storage and model training 370 to continuously improve algorithms for generating tactile output 380. The cloud storage and model training 370 may update the algorithms to reflect further optimization as informed by multiple systems.

In some embodiments, the AI audio system 330 may compare the audio input 310 to the audio output 360 to learn how the user 350 prefers the audio to be processed. The AI audio system 330 may analyze the parameters chosen by the user 350 in the basic controls 320 to learn how to optimize the parameters for the user 350. The AI audio system 330 may analyze the way the user 350 interacts with the user interface 355 (clicks, navigation) to learn how to optimize the user interface 355 and/or to learn which parameters are important to the user 350. The AI audio system 330 may analyze environmental and contextual data to learn in what context the AI audio system 330 is commonly utilized. The AI audio system 330 may analyze the parameters chosen by the user 350 and the way the user 350 interacts with the user interface 355 in conjunction with environmental and contextual data to learn how to optimize the tactile output 380 and/or the audio output 360 for different contexts. The AI audio system 330 may analyze sensor data from the tactile device 390 to learn how the tactile output 380 translates into physical movement felt by the user 350.

Figure 4:
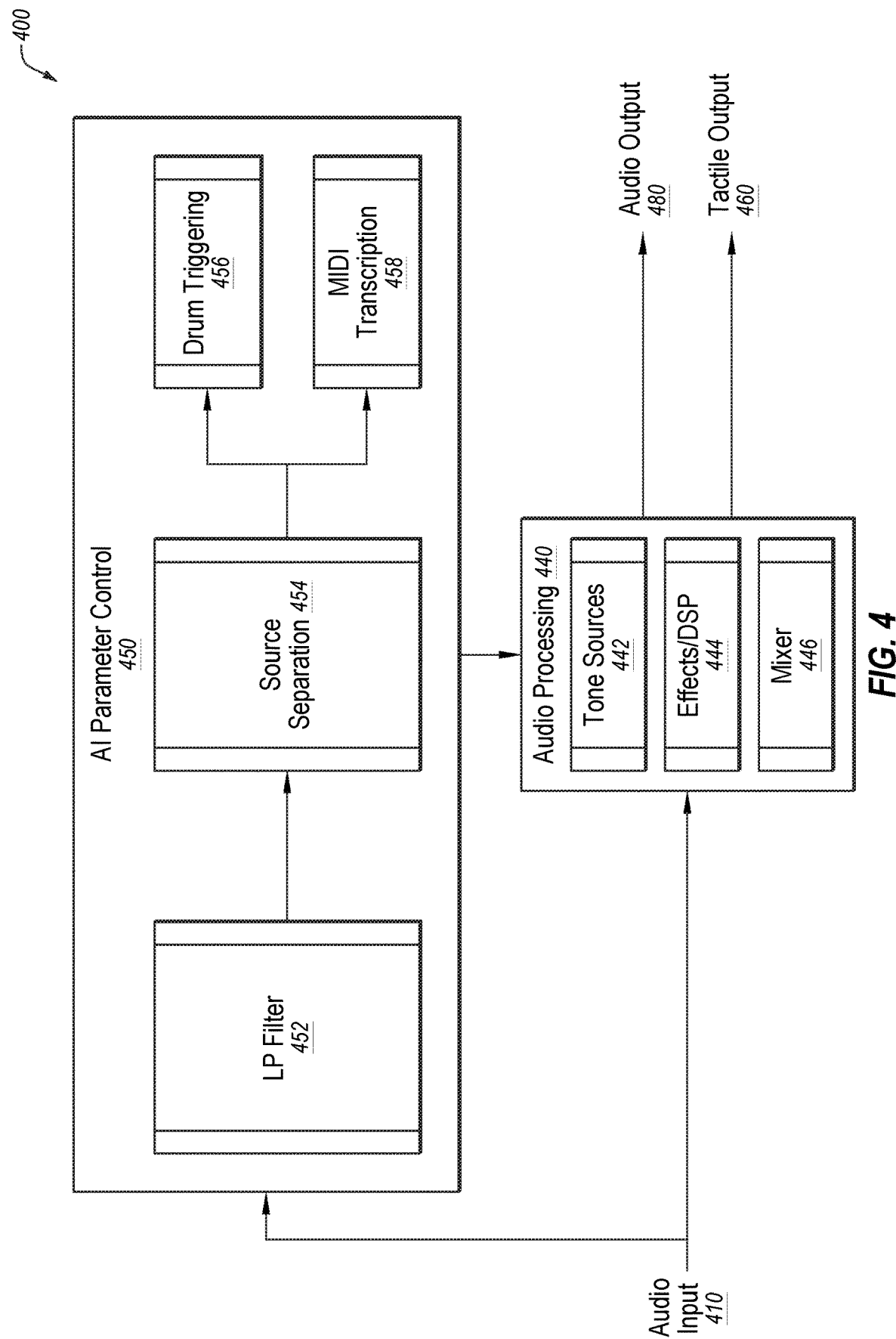
FIG. 4 illustrates an example system that may facilitate synthesis of tactile audio.

FIG. 4 illustrates an example system 400 that may facilitate synthesis of tactile audio, in accordance with one or more embodiments of the present disclosure. The system 400 may include the audio input 410 that may be similar or comparable to the audio input 110 of FIG. 1, an AI parameter control 450 that may be similar or comparable to the AI parameter control 150 of FIG. 1, audio processing 440 that may be similar or comparable to the audio processing 140 of FIG. 1, and/or may output tactile output 460 and/or audio output 480. The system 400 may be used in a similar or comparable environment to that illustrated in FIG. 1. FIG. 4 is provided to illustrate additional detail regarding the synthesis of the tactile output 460.

As illustrated in FIG. 4, in some embodiments the system 400 may be configured to synthesize the tactile output 460 for an audio signal 410 in which the audio signal may or may not include quality low frequency content from which the tactile output 460 may be output. For example, certain genres of music and/or older recordings may be devoid of such high-quality low-frequency content. In these and other embodiments, the AI parameter control 450 may be configured to use one or more operations to separate out components as one or more signals that may serve as the basis for the tactile output 460. In these and other embodiments, the signals identified as the basis for the tactile output 460 may be provided to the audio processing 440 to then perform processing on those signals to ultimately yield the tactile output 460.

In some embodiments, the AI parameter control 450 may be configured to apply a low-pass filter 452 to the audio input 410. For example, a filter that permits frequencies below about 300 Hz, below about 250 Hz, below about 200 Hz, or any other value, may be applied to the audio input 410.

In some embodiments, after filtering the audio input 410, the AI parameter control 450 may apply source separation 454 to the filtered audio input 410. For example, the source separation 454 may be any process or method by which constituent components, parts, instruments, etc. may be separated out as distinct sources within the low frequencies of the audio input 410. Such separation may include a blind source separation in which various patterns (such as repetitive spikes at a given frequency), given frequencies, etc. may be separated and/or attributed to a given source. In some embodiments, the blind source separation may utilize techniques such as non-negative matrix factorization (NMF), principal component analysis (PCA), independent component analysis (ICA), deep neural networks, or any other component separation analysis technique.

Additionally or alternatively, such separation may include a separation of harmonic tones from percussive tones. For example, percussion may have a particular style that may be recognized as one source and other harmonic/melodic tones may have another style that is also recognizable and the two may be separated. In some embodiments, such separation may utilize a spectrogram masking technique. In these and other embodiments, certain instruments may have distinct patterns that are readily recognizable between harmonic and percussive tones. For example, a bass (guitar, string, etc.) may provide harmonic tones that are in the low frequency range associated with tactile audio. As another example, a kick drum (or other drum) may provide percussive tones that are in the low frequency range associated with tactile audio. In these and other embodiments, the separation between percussive and harmonic tones may in turn facilitate identification of one or more such instruments (e.g., identification of a bass and a kick drum).

In some embodiments, the harmonic percussive source separation may be used in a number of ways. For example, the harmonic percussive source separation may be used to separate percussive and pitched sources from the tactile signal, which depending on the content can simply refer to kick drum and bass. Once separated, different processing may be applied to adjust the feel and balance of the different components. As another example, the harmonic percussive source separation may be used to allow fine control of the tactile sensation of an already decomposed signal (such as decomposed into sources and/or frequency bands). For example, tactile signals of a bass guitar may be processed to have less punch. As an additional example, the harmonic percussive source separation may be used as an analysis feature for the AI system to better understand the signal composition, and/or to achieve target metric values more effectively.

Figure 5:
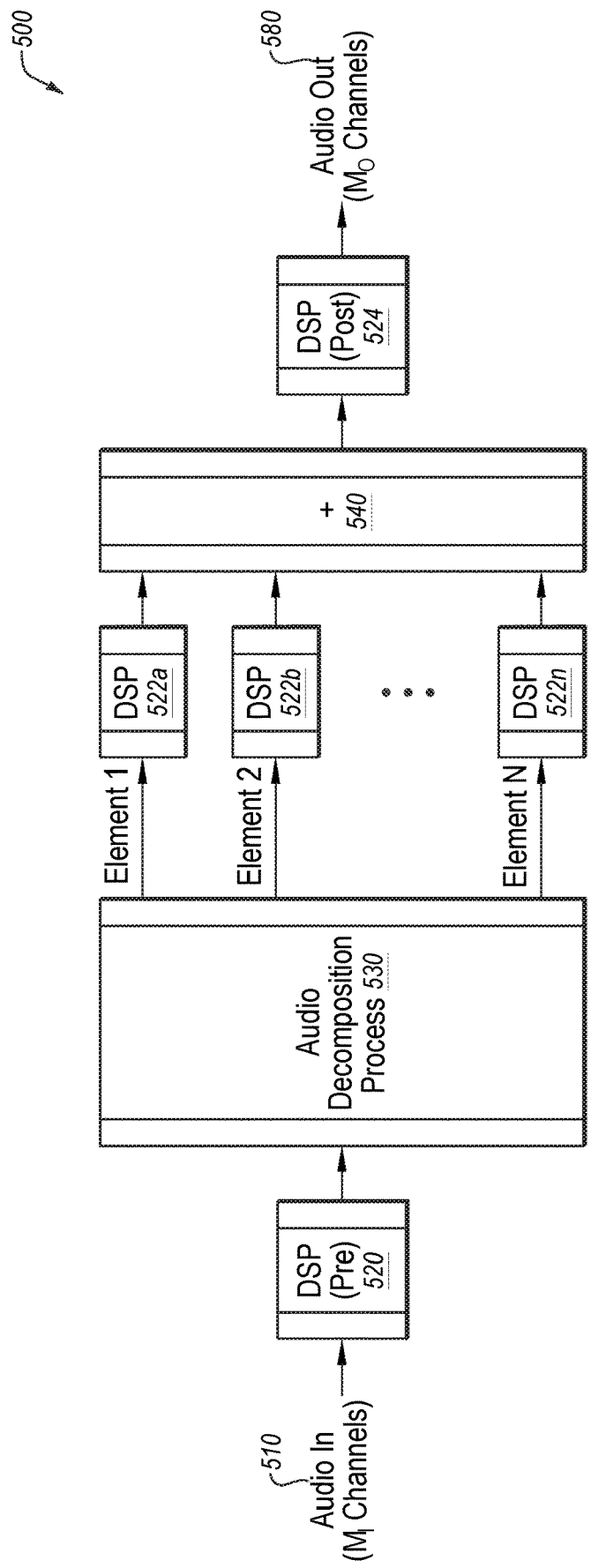
FIG. 5 illustrates an example system that may facilitate separate processing of tactile audio.

The decomposition process illustrated in the system of FIG. 5 may be one example of the source separation 454.

After the source separation 454, the AI parameter control 450 may perform one or more of drum triggering 456 and/or audio transcription processes (such as musical instrument digital interface (MIDI) transcription 458). For example, the drum triggering 456 may use transient event detection techniques to treat such events as triggering drum hits and/or notes. For example, isolated percussive signals may be detected by such transient event detection techniques and may facilitate providing timing and frequency data in the signal for the tactile audio. Turning to the example of the audio transcription process (e.g., MIDI transcription 458), the audio transcription process may include the conversion of audio content into a format that represents the notation, pitch, velocity, vibrato, temp, etc. of the audio content. Examples of such a transcription includes monophonic and/or polyphonic MIDI transcriptions. In some embodiments, to generate the audio transcription, the AI parameter control 450 may identify spectral peaks over time, determine pitch candidates from these peaks, and then connect the strongest candidates to form a pitch contour of the audio transcription. Additionally or alternatively, beat detection may be used by the AI parameter control 450 to determine the beat of the audio content and/or infer a time signature and/or tempo, thereby identifying the placement of notes. In these and other embodiments, the combination of the pitch contour and the detected beat may be used as the audio transcription.

In these and other embodiments, the audio transcriptions may serve as the basis for the tactile audio. For example, the notes of the audio signal 410 in the low frequencies may be converted into an audio transcription (such as a MIDI transcription) from which other digital tones may be identified. In some embodiments, when performing the audio transcription, one or more audio components may be added (such as via the drum triggering 456) and/or removed (e.g., because of the separation of a source as a voice source). In some embodiments, the drum triggering 456 and/or the audio transcription may be utilized in combination to yield the signal to serve as the basis for the tactile audio. After obtaining the signal to serve as the basis of the tactile audio, the associated data and/or signal(s) may be provided to the audio processing 440.

In some embodiments, the audio processing 440 may identify subharmonics of the tones of the signals output by the AI parameter control 450 to be used as the tactile output 460. For example, notes one or more octaves lower than the fundamental frequencies of the signals output by the AI parameter control 450 and/or those tones themselves may be utilized as the tactile output 460. In these and other embodiments, these subharmonic notes may be given a duration, intensity, etc. that may be adjusted, processed, and/or otherwise adjusted to assist the tactile output 460 in meeting one or more target values of one or more target metrics.

In some embodiments, the identification of the fundamental frequencies may be performed on the audio input 410 before filtering and/or before separation into sources. For example, one or more fundamental frequencies may be identified in the audible portion of the audio input 410. Such fundamental frequencies, even though in the audible portion, may serve as the basis for producing subharmonics one or more octaves deeper than the identified fundamental frequencies as the tactile output 460 and/or as the basis for the tactile output 460.

In some embodiments, the audio processing 440 may synthesize the tactile output 460 using frequency and temporal information (e.g., at what times the deep notes should be turned on/off). In these and other embodiments, the audio processing 440 may utilize tone sources 442 and apply effect 444 to be mixed together in a mixer 446 to yield the tactile output 460. For example, the tone sources may represent the distinct sources separated at the source separation 454. For each of the tones, the signal associated therewith may be an oscillating signal (e.g., sine, triangle, square, saw, etc. oscillating signal, depending on the tone/source). In some embodiments, the oscillators representative of the tactile audio signal may be combined and/or controlled according to the audio transcription described above (such as a MIDI transcription 458), which may facilitate control of the pitch and/or volume. In these and other embodiments, various effects 444 may be applied to the series of oscillators. The effects 444 are applied to such signals to achieve the desired tactile audio. For example, such effects 444 may include amplitude envelopes, filters and/or filter envelopes, transient shaping and compression, spatialization, and/or delay. For each of these, the shape of the oscillating signal may be modified and/or varied such that the signal reproduces the desired tactile audio.

While subtractive synthesis is used as the example herein, any of a number of synthesis techniques may be used, such as additive synthesis, subtractive synthesis, wavetable/vector synthesis, physical modeling synthesis, granular synthesis, and/or sampling pre-generated content.

After applying the effects 444 to the tone sources 442, the various tones may be recombined in the mixer 446. The mixer 446 may be any audio mixer or combiner that may level and/or combine the separated signals in a manner and format that may be usable by a tactile device and/or transducer to produce the tactile audio. For example, the mixer 446 may output the tactile output 460.

FIG. 5 illustrates an example system 500 that may facilitate separate processing of tactile audio, in accordance with one or more embodiments of the present disclosure. The system 500 may be used in a similar or comparable environment to that illustrated in FIG. 1. FIG. 5 is provided to illustrate additional detail regarding the decomposition of an incoming audio signal into component parts such that the component parts may be analyzed and/or processed independently. The system 500 may include a set of audio in channels 510 (designated as Mr channels), a signal processor 520 that may perform pre-processing, an audio decomposition process 530 that may separate the audio in channels 510 into distinct elements. Each of the elements may have their own signal processors 522a-522n, and may be recombined by a mixer 540. The combined signal may undergo post-processing at a signal processor 524 to yield a set of audio out channels 580 (designated as Mo channels).

The audio in channels 510 may include any input audio source, such as the audio input 110, 210, 310, and/or 410. Additionally or alternatively, the audio in channels 510 may include the audio sources from the source separation 454. Additionally or alternatively, the decomposition depicted in the system 500 may be used to facilitate the source separation 454 of FIG. 4.

The signal processor 520 may perform pre-processing of the audio-in channels 510. For example, the signal processor 520 may operate as a low-pass filter. As another example, the signal processor 520 may provide gain or reduction in amplitude to normalize the audio in channels 510, or any other processing.

In some embodiments, the audio decomposition process 530 may include any technique that may separate out the audio in channels 510 into sub-components thereof. For example, the audio decomposition process 530 may utilize blind source separation, harmonic/percussive source separation, and/or the detection of distinct sources in pre-generated content (e.g., distinct separate channels and/or sources may be designated independently in the audio in channels 510). In some embodiments, the pre-generated content may include multi-track audio, such as 5.1 audio signals, DOLBY® ATMOS® audio, etc. Additionally or alternatively, individual sources and/or channels may be mixed using the system 500 of FIG. 5.

In some embodiments, the audio decomposition process 530 may include a technique to separate the audio in channels 510 into different frequencies. For example, distinct frequency bands may be identified and various filters may be used to separate out the different frequencies such that each distinct band of frequencies may be analyzed and/or processed independently. For examples, different bands of frequencies may cause different sensations and by providing separate processing, each sensation may be accentuated, muffled, muted, etc.

In some embodiments, a low band may be experienced at the lowest frequency range associated with tactile audio, such as between 10 and 50 Hz, 5 and 50 Hz, 10 and 60 Hz, etc. Such a frequency range may provide a sensation of shaking. A medium band may be experienced at a medium frequency range associated with tactile audio, such as between 50 and 120 Hz, 60 and 150 Hz, 75 and 125 Hz, etc. Such a frequency range may provide a sensation of bass. A high band may be experienced at the highest frequency range associated with tactile audio, such as between 120 and 300 Hz, 125 and 350 Hz, 150 and 250 Hz, etc. Such a frequency range may provide a sensation of a buzz.

In these and other embodiments, frequency band separation may be performed using any of a variety of techniques to filter and/or separate the signals based on frequency. For example, band-pass filtering may be used to create parallel filtered time-domain signals. Such techniques may include high-order finite impulse response (FIR) filters. In some embodiments, a fast convolution may be used to leverage Fast Fourier Transforms (FFT) to improve the efficiency of such a technique. As another example, infinite impulse response (IIR) filters may be used to operate more efficiently than FIR filters. As a further example, uniform or non-uniform frequency domain filter banks may be generated using FFT-Inverse FFT (FFT-IFFT) to separate the signals into bands. As an additional example, wavelet transform filter banks may be generated to separate the signals into bands. In some embodiments, the frequency band separation may be performed by frequency domain processing where, rather than filtering into parallel time domain signals, the channels may be separated into the frequency domain (e.g., using FFT-IFFT) and any processing and/or analysis based on the frequency bands may be also performed while in the frequency domain.

As illustrated in FIG. 5, after the decomposition process 530, each of the sub-components may have independent processing by the signal processors 522a-522n performed thereon. Such processing may include adjusting the various components such that the overall tactile audio may be shifted towards the target metrics.

The mixer 540 may be similar or comparable to the mixer 446 of FIG. 4. The signal processor 524 may be similar or comparable to the signal processor 520, and may operate on the individually processed and combined elements. The output of the signal processor 524 may include the audio out channels 580. The audio out channels 580 may correspond to the tactile output and/or audio output 160/180, 260/280, 360/380, and/or 460/480. In some embodiments, the decomposition and distinct processing of individual components of signals may be applied to audible audio in addition to or distinctly from the tactile audio such that the audible audio may be modified and/or processed to enhance the complete audio experience when the tactile audio is introduced.

Figure 6:
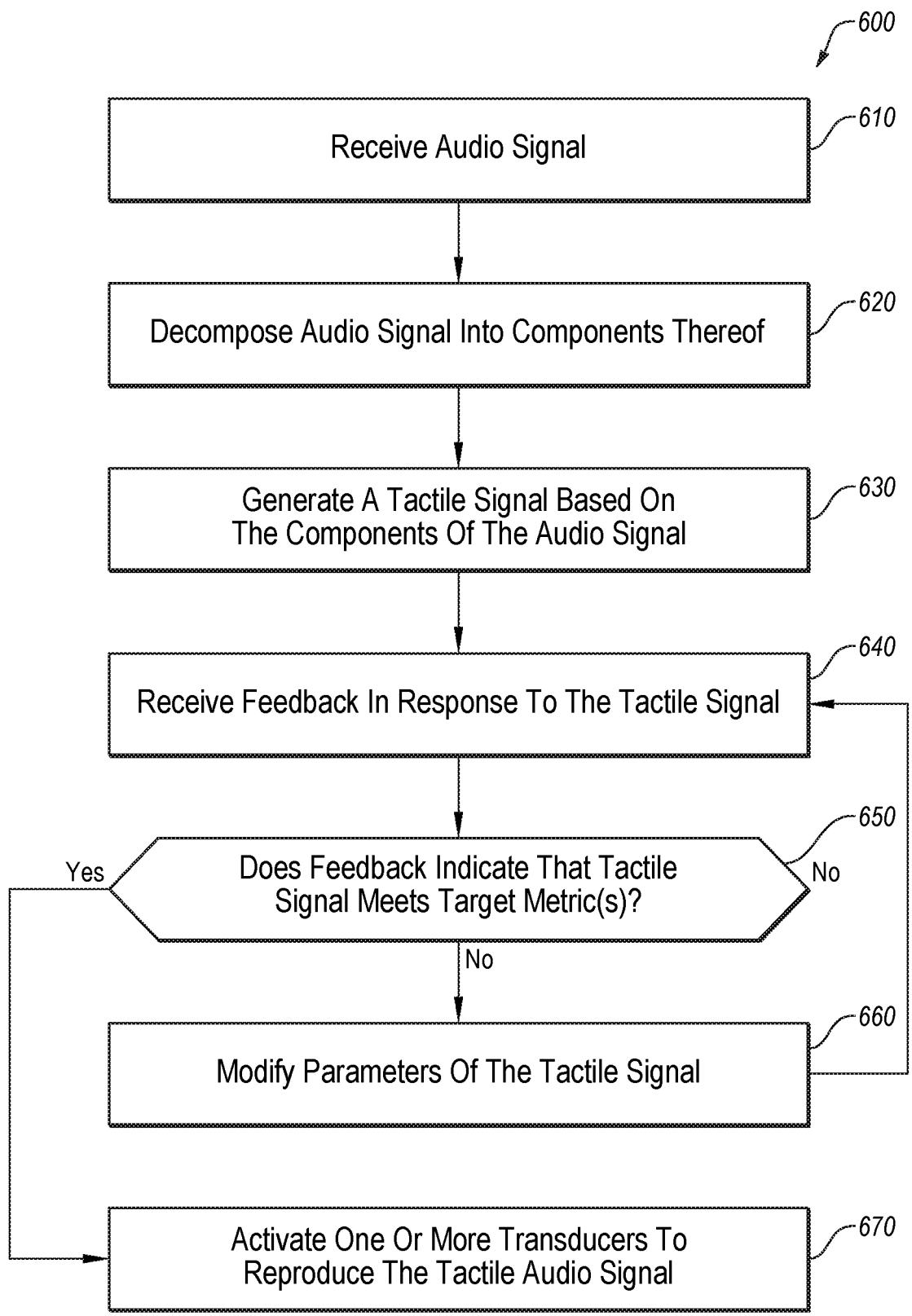
FIG. 6 illustrates an example method of enhancing tactile audio.

FIG. 6 illustrates an example method of enhancing tactile audio, in accordance with one or more embodiments of the present disclosure.

At block 610, an audio signal may be received. For example, an audio track may be downloaded, a streaming audio piece may be received, or any other audio signal may be received. The audio signal may be a real-time audio signal such that any processing, generation/synthesis of tactile audio, etc. may be performed on the fly.

At block 620, the audio signal may be decomposed into the component parts thereof. For example, a blind source decomposition may be used, or the signal maybe decomposed into harmonic and percussive tones. The system 500 may be an example implementation of a system for decomposition of the audio signal received at the block 610.

At block 630, a tactile signal may be generated based on the components of the audio signal. For example, subharmonics of the fundamental frequencies of the separated components and/or the fundamental frequencies themselves may be used as part of the tactile signal. As another example, a MIDI transcription of low frequencies in a track may be used as the basis for the tactile signal, and effects may be applied to components of the MIDI transcription.

At block 640, feedback may be received in response to the tactile signal. For example, after processing to generate, synthesize, and/or optimize the tactile signal, the post-processed signal may be analyzed with feedback indicating how effective the optimization/generation was relative to one or more target metrics. For example, the feedback may indicate how close to a given target metric the optimized/generated tactile signal may be. In some embodiments, the feedback may include sensor data, such as sensor data from a pressure sensor, a microphone, etc. In some embodiments, the feedback may include user input indicating a preference or enjoyment level of the user relative to a reproduction of the tactile signal to provide the user with tactile audio.

At block 650, a determination may be made whether the feedback indicates that the tactile signal meets one or more target metrics. For example, the feedback may indicate that a given parameter of the tactile signal is within a threshold amount of a given target metric. In some embodiments, the block 650 may include determining one or more values/ranks of one or more potential target metrics. If the tactile signal does not meet the target metric, the method 600 may proceed to the block 660. If the tactile signal meets the target metric, the method 600 may proceed to the block 670.

At block 660, one or more parameters of the tactile signal may be modified. For example, one or more of the parameters of the tactile signal may be changed to shift the tactile signal closer towards the target metric. After the block 60, the method 600 may return to the block 640 to receive additional feedback regarding the tactile signal after the modification.

At block 670, based on the tactile signal meeting the criteria, a tactile device (e.g., one or more transducers) may be activated to reproduce the tactile audio signal. For example, the tactile signal may be provided to powered SUBPAC® hardware, or some other tactile audio-producing device. In some embodiments, the tactile audio processing may be turned on/off.

Figure 7:
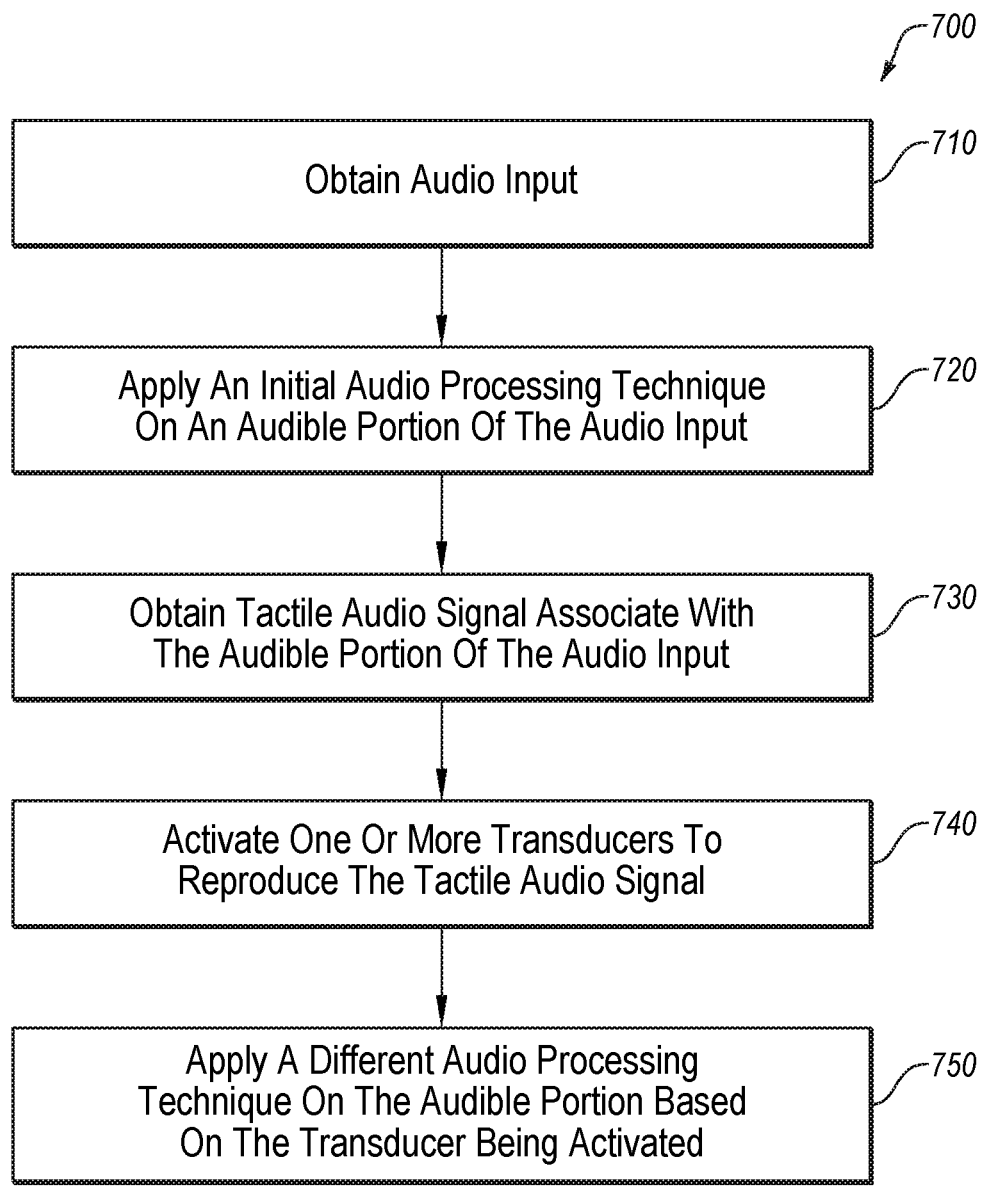
FIG. 7 illustrates another example method of enhancing tactile audio.

FIG. 7 illustrates another example method 700 of enhancing tactile audio, in accordance with one or more embodiments of the present disclosure.

At block 710, an audio input may be obtained. For example, an audio signal may be received. As another example, a sound producer or engineer may generate an audio signal as the audio input.

At block 720, an initial audio processing technique may be applied to an audible portion of the audio input. For example, the audio signal may undergo audio processing based on default equalizer settings or customized equalizer settings to set amplitudes of various frequencies of the audible signal.

At block 730, a tactile audio signal that is associated with the audible portion of the audio signal may be obtained. For example, the tactile audio signal may be generated, may be received from a cloud computing device, may be one of the tracks of the audio signal, etc.

At block 740, a tactile device (e.g., one or more transducers) may be activated to reproduce the tactile audio signal. For example, a user in a vehicle may press a button or invoke a control to turn on the tactile audio. As another example, a user wearing a backpack with a tactile audio-producing transducer may turn on the power to the transducer.

At block 750, a different audio processing technique may be applied to the audible portion than that used at the block 710 based on the tactile device being activated. For example, the different audio processing may be configured to tune or otherwise modify the recreation of the audible portion of the audio signal such that it complements the tactile audio more effectively than reproduced using the initial audio processing technique.

Figure 8:
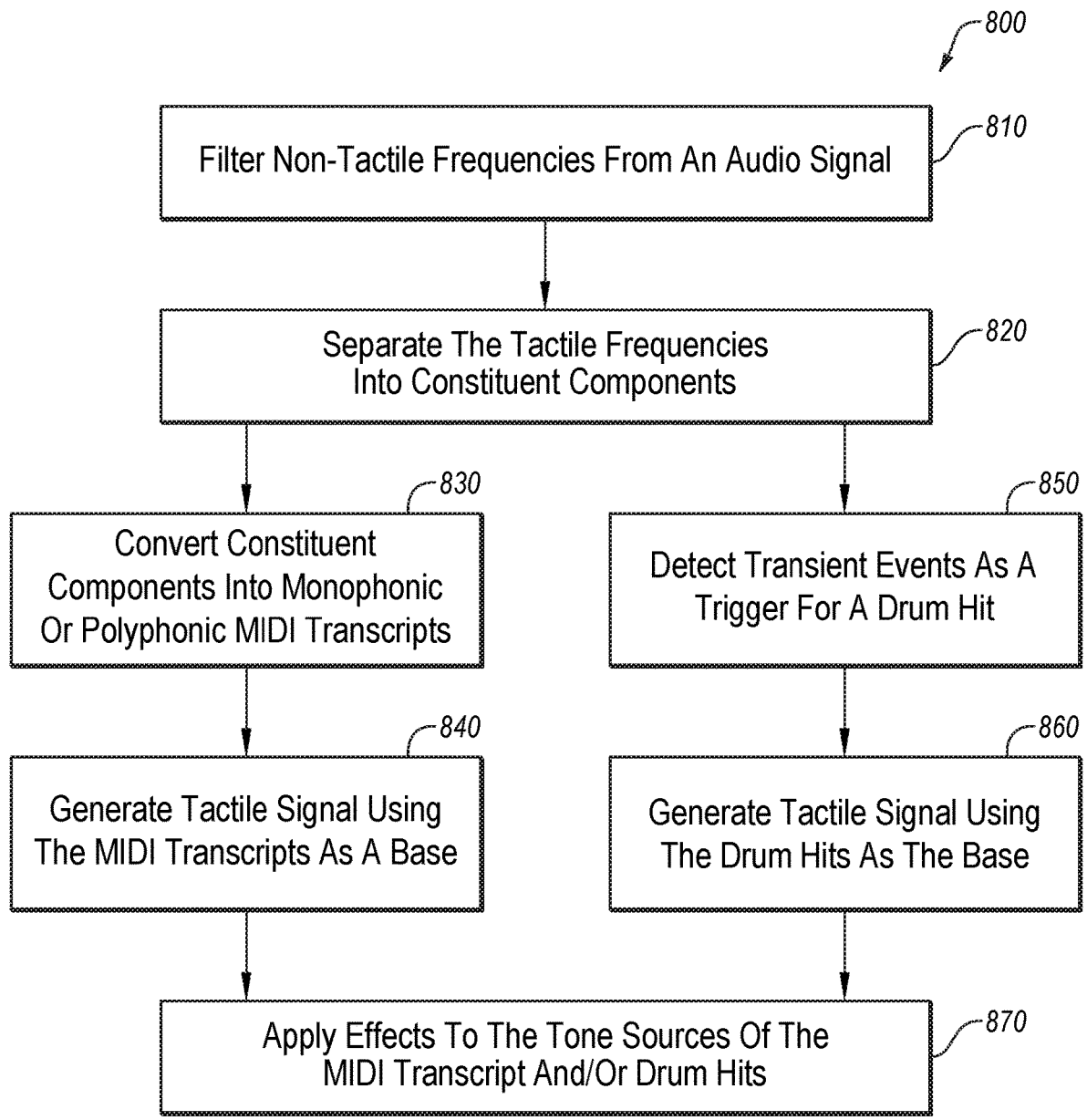
FIG. 8 illustrates an example method of synthesizing tactile audio.

FIG. 8 illustrates an example method of synthesizing tactile audio, in accordance with one or more embodiments of the present disclosure.

At block 810, non-tactile frequencies may be filtered from an audio signal. For example a low-pass filter may be applied to a received audio signal to filter out higher frequencies.

At block 820, the tactile frequencies may be separated out to their constituent components. For example, the low frequencies may be divided into sub-bands of frequencies. As another example, harmonic tones and percussive tones may be separated out from each other.

At block 830, one or more of the constituent components may be converted into monophonic or polyphonic MIDI transcripts (serving as an example implementation of audio transcripts generally). Such transcript may provide frequencies (e.g., tones) and times/durations for which those tones are to be reproduced.

At block 840, a tactile signal may be generated using the MIDI transcript(s) as a base. For example, the portions of the MIDI transcripts may serve as the base, and the tones in the MIDI transcript may be converted to a series of oscillators for the tactile signal.

At block 850, transient events may be detected as a trigger for a drum hit. For example, distinct transient events may indicate a pattern of a drum or other percussive instrument in the audio signal. For example, the frequency and/or time/duration of each transient event may be used as an expected drum hit and may serve as the signal basis.

At block 860, a tactile signal may be generated using the drum hits as the base for the tactile signal. In some embodiments, the harmonic tones may be processed/analyzed according to the blocks 830/840 and the percussive tones maybe processed/analyzed according to the blocks 850/860. In these and other embodiments, the tactile signal generated at the block 840 may be combined, mixed, etc. with the tactile signal generated at the block 860.

At block 870, effects may be applied to the tone sources of the MIDI transcript and/or the drum hits detected as generated in the tactile signal at the blocks 830-860. In some embodiments, the application of effects may facilitate the optimization of the tactile signal to shift the tactile signal towards the target metrics.

Figure 9:
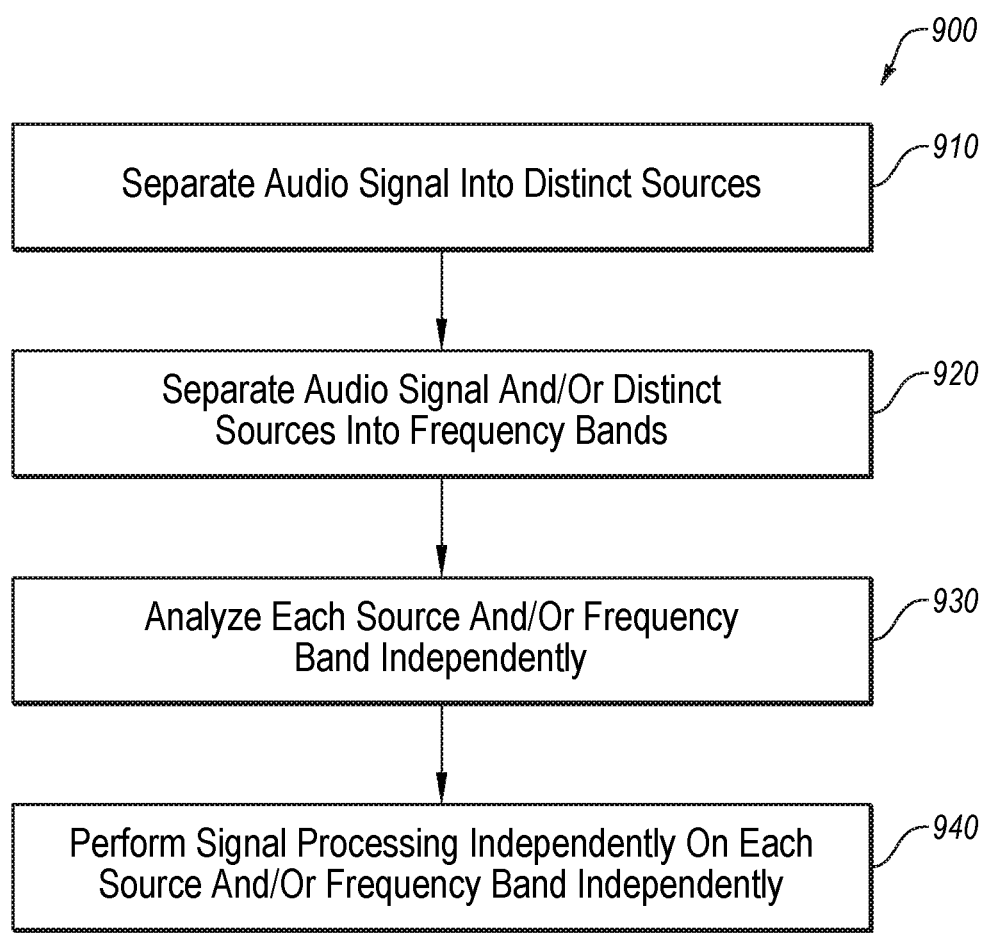
FIG. 9 illustrates an example method of separate processing of tactile audio.

FIG. 9 illustrates an example method 900 of separate processing of tactile audio, in accordance with one or more embodiments of the present disclosure.

At block 910, an audio signal may be separated into distinct sources. For example, the audio signal may be decomposed into its component parts using blind source separation. As another example, the harmonic and percussive components may be separated. As an additional example, different instruments may be separated out.

At block 920, the audio signal and/or distinct sources may be separated into frequency bands. For example, the block 920 may be performed instead of and/or as part of the block 910 such that the separation may include dividing the audio signal into bands of frequencies. In some embodiments, the separate components may be further separated into frequency bands. For example, a bass guitar track and/or a kick drum track may be separated into distinct frequency bands.

At block 930, each source and/or frequency band may be analyzed independently. For example, each source and/or frequency band may be analyzed to determine the respective effect on one or more target metrics. Such an operation may be particularly beneficial for target metrics which overlap, such as clarity in which relationships between frequencies may impact the target metric.

At block 940, signal processing may be performed independently on each source and/or frequency band. For example, based on the relationship to the target metrics, each source and/or frequency band may have processing applied thereto to shift the source and/or frequency band closer to the target metric such that the overall tactile audio signal may be more in line with the target metrics.

One or more operations of any of the methods 600, 700, 800, and/or 900 may be performed by a system or device, or combinations thereof, such as any computing devices hosting any components of the environments illustrated in FIGS. 1-3 and/or the systems illustrated therein and/or in FIGS. 4 and 5, such as a computing devices that perform optimization and/or learning related to the analysis, improvements, and/or presentation of tactile audio, etc. Although illustrated as discrete blocks, various blocks of the methods 600, 700, 800, and/or 900 may be divided into additional blocks, combined into fewer blocks, or eliminated, depending on the desired implementation. Additionally, modifications, additions, or omissions may be made to any of the methods 600, 700, 800, and/or 900 without departing from the scope of the disclosure. For example, the operations of the method methods 600, 700, 800, and/or 900 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments In some embodiments, a system for enacting the method for optimizing personalized tactile feedback may include a computing device (not illustrated). Such a computing device may be configured to facilitate the performance of the operations described herein, such as determining characteristics of an audio signal, generating a tactile signal, modifying a tactile signal, etc. Such a computing device may include a processor, a memory, etc. and may be in communication with and/or part of the system for enacting the method for optimizing personalized tactile feedback.

Generally, the processor may include any suitable special-purpose or general-purpose computer, computing entity, or processing device including various computer hardware or software modules and may be configured to execute instructions stored on any applicable computer-readable storage media. For example, the processor may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

It is understood that the processor may include any number of processors distributed across any number of networks or physical locations that are configured to perform individually or collectively any number of operations described herein. In some embodiments, the processor may interpret and/or execute program instructions and/or processing data stored in the memory. By interpreting and/or executing program instructions and/or process data stored in the memory, the device may perform operations, such as the method for optimizing personalized tactile feedback described in the present disclosure.

The memory may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. In these and other embodiments, the term "non-transitory" as used herein should be construed to exclude only those types of transitory media that were found to fall outside the scope of patentable subject matter in the Federal Circuit decision of *In re Nuijten,* 500 F.3d 1346 (Fed. Cir. 4007). In some embodiments, computer-executable instructions may include, for example, instructions and data configured to cause the processor to perform a certain operation or group of operations as described in the present disclosure.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method. For example, the dashed lines of the illumination paths and imaging paths are not meant to reflect an actual optical design, but are illustrative of the concepts of the present disclosure.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the term "about" or "approximately" should be interpreted to mean a value within 10% of actual value.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one"

or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method of optimizing personalized tactile output comprising:
   receiving an audio signal;
   decomposing the audio signal to identify one or more components of the audio signal;
   generating, by an artificial intelligence system, a tactile signal based on the one or more components of the audio signal, the tactile signal representative of tactile audio corresponding to the audio signal;
   providing the generated tactile signal to a tactile device to produce the tactile audio;
   in response to the generated tactile signal, receiving feedback; and
   modifying parameters of the tactile signal in response to the received feedback based on a use-case of the tactile device for reproducing the tactile signal.

2. The method of claim 1, wherein receiving feedback comprises receiving user input identifying a user preference associated with the tactile signal.

3. The method of claim 1, wherein receiving feedback comprises receiving an electronic signal from a sensor while a tactile device for reproducing the tactile signal is active.

4. The method of claim 1, wherein receiving feedback comprises comparing the tactile signal to a target metric before activation of a tactile device for reproducing the tactile signal, and wherein modifying parameters of the tactile signal is performed to shift the tactile signal closer to the target metric than the tactile signal was before receiving the feedback.

5. The method of claim 1, wherein modifying parameters of the tactile signal comprises iteratively adjusting the parameters of the tactile signal based on iteratively receiving the feedback to shift the tactile signal towards a target metric.

6. The method of claim 1, wherein the received audio signal is a real-time audio signal.

7. The method of claim 1, wherein decomposing the audio signal comprises:
   extracting individual audio components of the audio signal; and
   analyzing each of the individual audio components of the audio signal.

8. The method of claim 7, wherein extracting individual audio components comprises separating harmonic sounds from percussive sounds; and
   wherein the artificial intelligence system treats the harmonic sounds separately from the percussive sounds in generating the tactile signal.

9. The method of claim 1, wherein generating the tactile signal comprises:
   filtering non-tactile frequencies out of the audio signal to yield tactile frequencies of the audio signal;
   separating the tactile frequencies of the audio signal into constituent components;
   analyzing the constituent components of the tactile frequencies of the audio signal; and
   synthesizing the tactile signal based on the analysis by individually adjusting each of the constituent components.

10. The method of claim 9, wherein analyzing the constituent components comprises at least one of:
    converting each of the constituent components into an audio transcription upon which the synthesized tactile signal is based; and
    detecting transient events as a trigger for tactile content.

11. The method of claim 1, wherein generating the tactile signal comprises:
    identifying a fundamental frequency of the audio signal;
    identifying subharmonics of the fundamental frequency for inclusion in the tactile signal; and
    compiling the identified subharmonics into the tactile signal.

12. The method of claim 1, wherein generating the tactile signal is performed based on a use-case of the tactile device for reproducing the tactile signal, the use-case of the tactile device comprising at least one of:
    to recreate a tactile sensation associated with a given audio experience;
    to generate a neutral experience during audio production; and
    to create a new tactile audio experience.

13. The method of claim 1, wherein generating the tactile signal is performed based on a context within which a tactile device for reproducing the tactile signal is used, the context of the tactile device comprising at least one of:
    the tactile device disposed in association with a seat of a vehicle;
    the tactile device disposed in association with a chair or couch; and
    the tactile device disposed in association with a wearable device.

14. The method of claim 1, wherein decomposing the audio signal comprises extracting a plurality of frequency bands as tactile audio frequency bands.

15. The method of claim 4, wherein generating the tactile audio comprises applying distinct audio processing to each of the tactile audio frequency bands.

16. A method of personalizing an audio experience comprising:
    obtaining audio input;
    obtaining a tactile audio signal associated with an audible audio portion of the audio input;

prior to activating a tactile device, applying a first audio processing technique to the audible audio portion of the audio input activating the tactile device to reproduce the tactile audio signal; and applying a second audio processing technique on the audible audio portion of the audio input based on the tactile device being activated instead of a first audio processing technique applied when the tactile device is not activated.

17. A system, comprising:
   a tactile device configured to receive a tactile signal and generate vibrations corresponding to a tactile audio experience based on the tactile signal; and
   a computing device configured to perform operations comprising:
      receiving an audio signal;
      decomposing the audio signal to identify one or more components of the audio signal;
      synthesizing, by an artificial intelligence system of the computing device, a synthesized tactile signal based on the one or more components of the audio signal;
      providing the synthesized tactile signal to the tactile device;
      in response to the synthesized tactile signal, receiving feedback; and
      modifying parameters of the tactile signal in response to the received feedback based on a use-case of the tactile device for reproducing the tactile audio experience.

* * * * *